Aug. 10, 1954  F. LEIGHTON  2,685,889
VALVE OF THE CHECK VALVE TYPE
Filed March 23, 1953  2 Sheets-Sheet 1
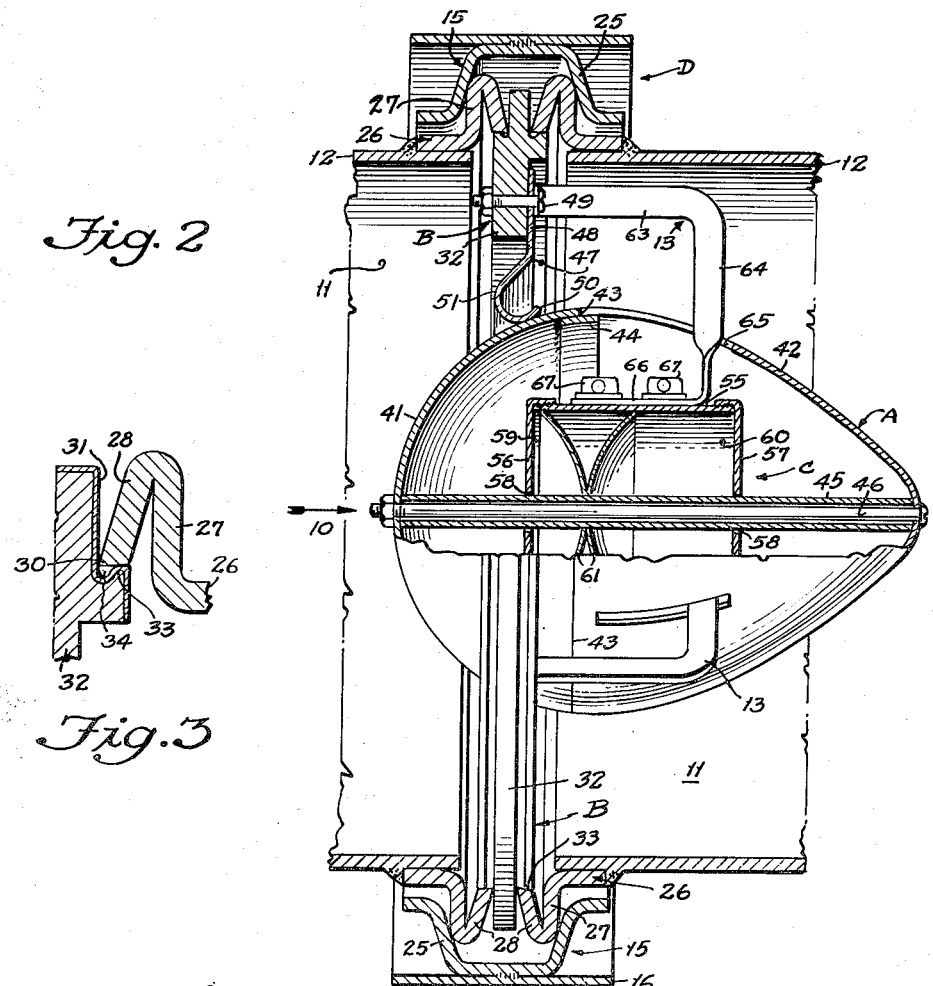
Fig. 2
Fig. 3
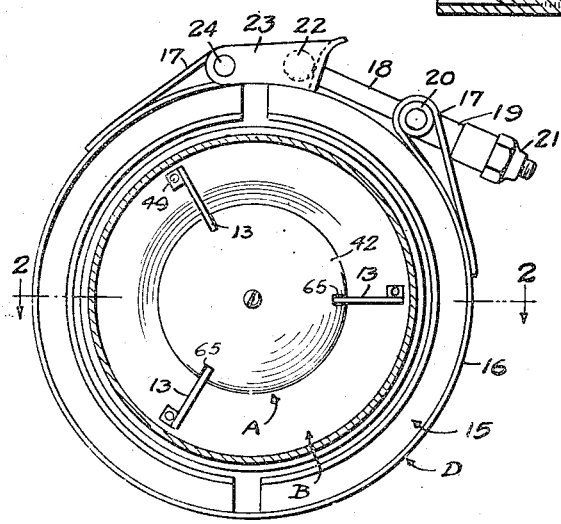
Fig. 1
INVENTOR.
FRANCIS LEIGHTON
BY
Lynn H Latta
ATTORNEY Aug. 10, 1954　　　F. LEIGHTON　　　2,685,889
VALVE OF THE CHECK VALVE TYPE
Filed March 23, 1953　　　2 Sheets-Sheet 2
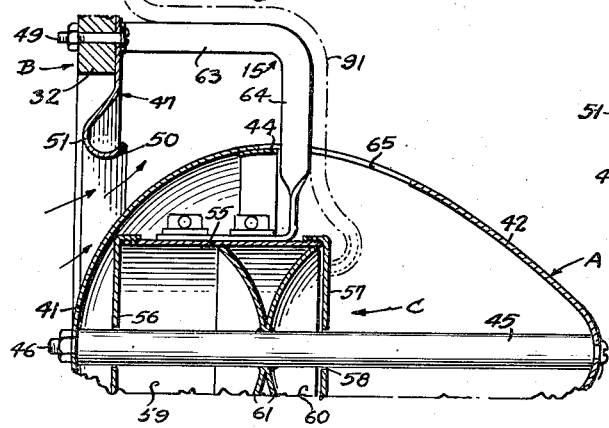
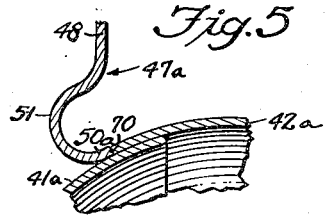
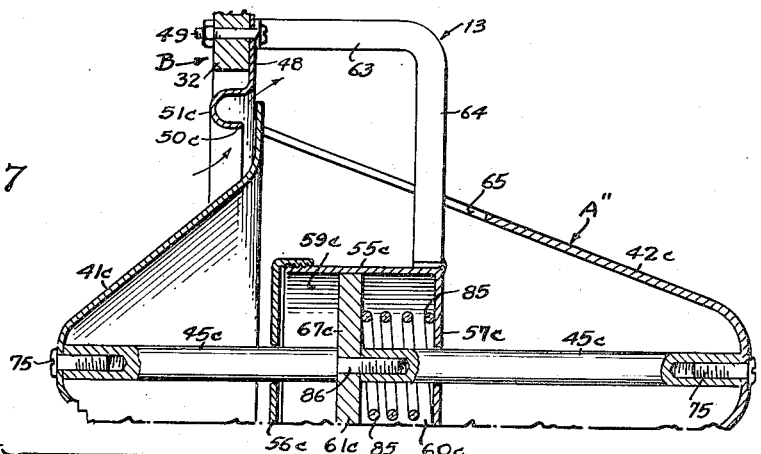
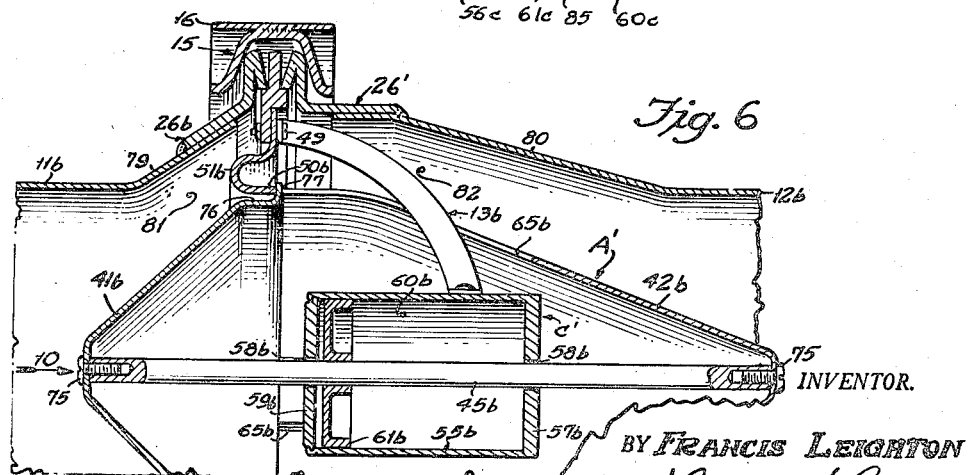
INVENTOR.
BY FRANCIS LEIGHTON
- ATTORNEY -

Patented Aug. 10, 1954

2,685,889

UNITED STATES PATENT OFFICE 2,685,889

VALVE OF THE CHECK VALVE TYPE

Francis Leighton, Altadena, Calif., assignor to Marman Products Company, Inc., Los Angeles, Calif., a corporation of California Application March 23, 1953, Serial No. 343,821

13 Claims. (Cl. 137—536)

1

This invention relates generally to valves and in particular to valves of the type including pressure relief valves, check valves and pilot controlled valves. A general object of the invention is to provide a valve of this general class, embodied in a unit which may be readily inserted in a joint between a pair of tube sections.

The invention is particularly concerned with the problem of obtaining a high degree of responsiveness to varying degrees of fluid pressure tending to open the valve, or to changes in the direction of flow. To this end, the invention contemplates a valve of the type indicated, having a minimum drag or resistance to fluid flow in any position of opening thereof.

The invention is further concerned with the problem of avoiding chatter in a pressure relief valve or a check valve. Conventional valves of this general class have a tendency to be unstable because of the variation in pressure drop across the valve seat as the valve varies between a closed or nearly closed position and an open or partially open position. In the case where a pressure relief valve is closed and is subjected to a fluid pressure in the opening direction at a value just at the point of opening the valve, there will be a tendency for the valve, when its resistance to opening is finally overcome by the rising fluid pressure, to open to a greater degree than is required in order to maintain the fluid pressure at a preselected pressure relief value, and the valve will then return toward its seat. In this return movement there will be a tendency to close to a greater extent than is necessary in order to raise the pressure acting on the valve back to the predetermined pressure relief value. Thus the valve tends to "hunt" toward a stable position where the exact relief pressure is established at the valve aperture, but without actually attaining such stable position. In many cases, the valve will continue to chatter as a result of this hunting tendency.

A specific object is to provide a valve of the check valve type (wherein valve opening movement is not opposed by spring pressure) adapted to assume a fully open position in response to any fluid pressure, no matter how slight, in the valve opening direction, and yet resistant to the tendency to move rapidly under sudden pressure surges.

Toward the solution of the above mentioned problems, one of the major objects of the present invention is to provide a check valve which, in addition to the low flow resistance characteristic mentioned above, has means for dampening valve

2 movement so as to inhibit chatter and unnecessary movements, and to cause the valve to smoothly move, with minimum travel, to whatever position may be required in order to compensate for flow changes or (in the case of a pressure release valve) to balance the pressure across the valve seat at the pre-determined release value.

Specifically, the invention contemplates a valve having a dash pot type of mounting, wherein the dash pot mechanism resists movement of the valve in either direction with a resistance which increases with the speed at which the valve tends to move. Furthermore, the invention contemplates a valve wherein such dashpot mounting is disposed entirely within a faired hollow valve body which moves on an axis paralleling the direction of flow in the fluid passage in which the valve is mounted, the dashpot mounting being suspended from the valve seat by means which is arranged to have a negligible fluid flow resistance and which extends through the wall of the hollow valve body.

A still further object of the invention is to provide a valve assembly which, in addition to the characteristics indicated above, has the feature of combining an annular valve seat with a seal for closing the joint between sections of tubing defining the fluid line in which the valve is mounted; the valve being suspended from this combined valve seat and seal and the entire assembly being readily insertable in a joint between tube sections with maximum dispatch and ease, and being as readily removable for inspection or repair. In this connection the invention also contemplates a valve assembly which is particularly adapted for use with a quick-release coupling between tube sections.

A further object of the invention is to provide an improved dash pot mounting wherein there is a combination of dash pot action together with a snubbing effect derived from frictional engagement of edges of the dash pot piston with the wall of the dash pot cylinder.

A further object of the invention is to provide a valve assembly having the characteristics indicated above and, in addition, being of relatively simple, inexpensive and yet thoroughly durable and reliable structure.

Other objects will become apparent in the ensuing specifications and appended drawings in which:

Fig. 1 is a sectional view taken radially through a fluid line in which the invention is embodied;

Fig. 2 is an axial sectional view through the joint and valve assembly taken on the line 2—2 of Fig. 1;

Fig. 3 is a fragmentary, enlarged detail sectional view of a portion of the seal;

Fig. 4 is an axial sectional view of the valve of Fig. 2, shown in the open position;

Fig. 5 is a fragmentary detail axial sectional view of a modified form of the invention;

Fig. 6 is an axial sectional view of a tubing joint and valve assembly embodying another modified form of the invention; and Fig. 7 is an axial sectional view of a valve unit embodying a further modification of the invention.

*General description*

Referring now to the drawings in detail, I have shown as an example a tubing joint in which the invention may be embodied, a check valve mounted within a flow passage 11 defined within aligned tube sections 12 and operable, with a minimum of resistance, to permit flow in the direction indicated by arrow 10, and to check flow in the event of any tendency of the fluid to travel in the opposite direction.

The valve of my invention includes, in general, a movable valve body A supported by a combined valve seat and joint sealing member B, together with a dash pot mounting C by means of which the valve A is mounted for axial translational movement along the axis of passage 11, the mounting C being suspended from annular seatseal member B by a series of brackets 13.

Combined seat-seal unit B is secured between the ends of tube sections 12 by means of a coupling D the specific details of which do not form any part of the present invention. The coupling D is, however, preferably of a quick-release type and may embody a V-band clamp comprising a plurality of V-channel segments 15 secured to an encircling constrictor band 16 the ends of which are formed into loops 17 connected by a quick-release latching and take-up unit. Merely by way of example of a suitable latching unit, we have illustrated a common type of such latching unit comprising a T-bolt having a shank 18 slidably mounted in a central tubular arm 19 of a T-trunnion having a cross head 20 journalled in one of the loops 17, a nut 21 being threaded onto the end of the shank 18 and bearing against tubular arm 19, and the T-bolt having a head 22 which is receivable within a latch yoke 23 that is pivoted at 24 to the other loop 17, the shank 18 being received in a notch in the web portion of yoke 23. These details do not form any part of the present invention and it will be understood that other types of quickrelease connector units may be substituted for the one described above.

The jaw segments 15 include radially inwardly diverging frustro-conical jaws 25 adapted to engage flange units 26 which are attached to the ends of tube sections 12. Flange units 26 include radially outwardly extending flange portions 27 and inwardly folded, coned flange portions 28 which diverge inwardly from the flange portions 26 so as to constitute, in effect, Belleville washer elements which are integral parts of the tube sections 12. The inner margins of coned flange members 28 are beveled to provide acute edges 30 which are adapted to be embedded, under axial pressure, in lateral surfaces 31 of the annular body 32 of combined valve seat and seal B. In order that the edges 30 may become embedded in the seal surfaces 31 sufficiently to form a fluid tight pressure seal, the surfaces 31 are preferably formed by a coating of a material softer than that of flange units 26 (e. g. a coating of soft copper).

An improved sealing action is obtained by arranging for the edges 30 to engage surfaces 31 that are in the form of flat lateral surfaces To this end, surfaces 31 are continued below the diameter of a pair of shoulders 33 which form seats for the inner margins of coned flange elements 28, and are joined to shoulders 33 by annular, outwardly facing grooves 34 in the annular body 33.

Because of the inward divergence of coned flange members 28 from the outer flange members 27, the members 28 partake of the characteristics of Belleville spring washers, having some flexibility in adapting themselves to the alignment of edges 30 to the planes of surfaces 31, and having the further characteristics of shrinking the diameter of their inner margins as they are deflected, thereby establishing a pressure contact with seating shoulders 33 which aids in the sealing effect.

In each of the several forms of the invention herein disclosed, the annular body 33 constitutes a common portion of the seal between flange units 26 and the valve seat with which movable valve body A cooperates.

*The valve assembly of Figs. 1–3*

The valve body A of Fig. 2 comprises a hollow shell which may include fore and aft sections 41, 42 respectively, meeting at a circular parting line, indicated at 43, at the plane of maximum diameter thereof. Shell section 41 has an internal collar 44 secured therein, as by welding, and projecting to form a pilot which is received in the mouth of shell section 42. The shell 41, 42 is carried by a mounting rod comprising a tube 45 and a stay bolt 46 extending therethrough, the bolt 46 piercing the ends of the shell and its head and nut engaging said ends to secure the sections in assembled relation, with the collar 44 piloted within the mouth of shell section 42.

Shell 41, 42 is circular and coaxial with shaft 45, 46, in all transverse sections thereof from the forward to the rearward end thereof. In longitudinal section, it is faired so as to offer minimum resistance to air flow, its forward end surface (defined by shell section 41) being more blunt and its rearward surface, (defined by shell section 42) being more tapered. In the particular form shown in Fig. 2, shell 41 is semispherical and shell section 42 resembles a paraboloid, the entire shell surface being roughly of a tear-drop contour, so as to minimize drag in the flow of fluid around the valve body.

An annular valve seat ring 47 is carried by annular body 32, and has a flat outer portion 48 constituting a mounting flange which is secured by means of bolts 49 to the rear face of a portion of annular body 32 which projects radially inwardly from the portion embodying shoulders 33. The inner portion of valve seat ring 47 is formed into a valve seat 50 of toroidal contour (convexly curved in radial section), and is arranged so that the valve body A will seat against a portion of its surface which flares rearwardly (in the direction of flow). The valve seat 50 is arranged to engage valve body A forwardly of the maximum diameter of valve body A. Thus, when the valve A has moved rearwardly to an open position (Fig. 4) the passage between the valve body and the valve seat 50 will be a rearwardly flaring passage and will be of venturi shape because of the convexity of the opposed surfaces of valve body A and valve seat 50 between which the valve passage is defined. This combination of rearward flaring and Venturi shape in the valve passage, minimizes the resistance to the flow of fluid past the valve and is conducive to a smooth flow of the fluid around the valve body with a minimum of disturbance.

In obtaining the toroidal, surface of valve seat 50 it is advantageous to form the valve ring 47 with a forwardly projecting toroidal surface 51 which increases the smoothness of flow.

The dash pot unit C, in the form of the invention shown in Fig. 2, comprises a cylinder 55 having end caps 56, 57, provided with central apertures 58 through which tube 45 is slidably extended. Just sufficient clearance is provided between tube 45 and the edges of apertures 58 to provide annular bleed spaces through which a controlled, restricted flow of fluid into and out of chambers 59, 60 within piston 55 at the respective ends thereof, is provided. Such flow is induced by the movement of a piston which is secured to tube 45, said piston comprising a pair of opposed, outwardly flaring dished disc members 61. Discs 61 are of thin, flexible, highly elastic sheet material, preferably spring sheet metal. The peripheral edges of discs 61 are in yielding, frictional engagement with the inner wall of cylinder 55, the dished form of the washers causing the frictional engagement to increase as the result of a tendency for the leading washer to flatten and to bind against the cylinder wall. This frictional engagement, plus the dash pot effect in chambers 59 and 60 (defined between the piston 61 and the respective end caps 56, 57) provides a resistance to movement of valve body A which increases in accordance with the speed at which the valve body tends to move. Thus, the valve body is induced to move slowly, and smoothly at all times, and to stop as soon as the change in pressure or flow conditions by which its movement has been induced, is counteracted or balanced out.

Cylinder 55 is suspended on one or more of the brackets 13, three of them being shown in Fig. 1, in symmetrically spaced relation about the valve axis. Brackets 13 may be of elbow shape, each including an arm 63 extending rearwardly, in a generally axial direction from the annular body 32, an arm 64 extending radially inwardly from arm 63 and through a slot 65 in valve body A, and a tab 66 extending axially and secured to the cylinder 55 in any suitable manner, as by means of securing element 67. Arms 63 are attached to body 32 by the same bolts 49 which secure the valve seat ring 47.

Slots 65 are located in the rearwardly tapering rear section 42 of the valve body for two reasons: (1) so that the forward section 41 may be circumferentially continuous and thereby establish full sealing engagement with its seat (2) so that the flow disturbance caused by the slots 65 may be minimized.

Air flow resistance by brackets 13 is reduced to a negligible minimum by forming the brackets of relatively thin sheet metal and arranging them in planes parallel to the valve axis (i. e. parallel to the direction of fluid flow). The slots 65 are correspondingly narrow, so as to maintain maximum area of the faired surface of the valve body shell. Within the valve body, the arms 64 may be twisted in order that the tabs may extend axially.

Fig. 5 illustrates a slight modification of the valve arrangement shown in Fig. 2, the valve seat 50a being tangent to the surface of forward valve body section 41a where it engages the same, and the rear edge of valve seat 50a closing against the forward edge of rear valve body section 42a to provide a more fluid tight closing of the valve than is possible in the previously described arrangement, for installations where the tight closing is required. The valve body shell differs from that of Fig. 2 in that the forward portion of shell action 42a overlaps the rearward portion of shell section 41a so as to provide the exposed forward edge 70 of shell section 42, against which the rear edge of valve seat 50a meets.

*The preferred form of the invention—Fig. 6*

For most purposes, an arrangement which is somewhat simplified in its constructional aspects and retains a greater uniformity of operating characteristics over extended periods of service, is preferable. Such a modification of the invention is shown in Fig. 6. In this form of the invention, the piston 61b of fixed, rigid shape, is attached to a mounting rod 45b the ends of which are attached to the respective ends of shell sections 41b, 42b by screws 75 extending through the ends of the shell sections and threaded into the ends of the rod 45b. Forward shell section 41b is largely frustro-conical in shape, and has a rim portion 76 which is cylindrical and terminates in a radial, outwardly projecting flange 77. Rim portion 76 extends, with radial clearance, through the valve port defined by the cylindrical inner collar 50b of valve seat ring 47b, the rear edge of collar 50b constituting the valve seat. Flange 77 constitutes the seating portion of the valve body A', and also provides a surface against which the forward edge of rear shell section 42b is seated under sufficient pressure, developed by screws 75, to hold the sections together. The flange 50b constitutes the inner portion of an annular channel member 51b which presents a faired leading surface to the approaching fluid flow, so as to minimize eddy disturbance.

Another feature of the invention as disclosed in Fig. 6 is the utilization of tube sections 11b, 12b which have belled end portions 79, 80 to which the flange units 26b, 26' are respectively secured. This expansion of the tube diameter at the joint makes it possible to have the valve port diameter as large as the normal tube diameter. The belled tube portions 79, 80 are spaced radially from the inner surfaces of shell sections 41b, 42b respectively, to define annular passages 81, 82, leading to and from the valve port, and are generally parallel thereto, but are inclined at a slightly lower angle of taper, so that the passages 81, 82 are narrower at the valve port than at the respective ends of the valve body. Thus the passages 81, 82 cooperatively define an annular venturi passage which speeds up the flow of air as it passes through the valve port and facilitates the smooth flow of the fluid around the valve body with minimum drag.

The retarding action of dash pot unit C' of Fig. 6 is purely a dash pot (pneumatic) action, with no appreciable frictional engagement of piston 61b with cylinder 55b. Restriction of flow into and out of chambers 59c, 60b is provided by the annular bleed ports 58b.

The mounting brackets 13b of Fig. 6 are elbow shaped but are of arched contour instead of the L-shape illustrated in the other figures. Slots 65b may extend all the way to the forward edge of shell section 42b, as indicated.

The valve shown in Figs. 1 and 6 are check valves, and do not utilize a spring load opposing the opening of the valve. Thus in these valve assemblies, the valve bodies move in response to changes in direction of fluid flow, the valves being normally open for normal flow in the direction indicated by arrows 10, and closing in the event back pressure in the opposite direction is developed in the fluid line.

Fig. 7 illustrates the invention as applied to a pressure release valve, wherein the valve is spring loaded toward closing position by a suitable means such as the coil spring 85 which is engaged between the piston 61c and the cylinder end 57c of cylinder 55b. As a convenient means of mounting piston 61c on mounting rod 45c, the latter is constructed in two sections, with a tang 86 on one section extending through an opening in piston 61c, threaded into the other section, and with the piston 61c gripped between the two sections of the rod. Shell sections 41c and 42c of valve body A'' of Fig. 7 correspond generally to the shell sections of valve body A' of Fig. 6, and the valve seat and seal unit, including parts 50c, 51c, etc., are similar to the corresponding parts of Fig. 6.

Fig. 4 illustrates, in phantom, a pilot fluid line 91 which may be added to the valve arrangement shown in Fig. 2, for the purpose of converting such valve unit into a pilot control valve wherein a variable fluid pressure introduced into chamber 60 opposes the flow pressure against valve body A and thereby provides for remote control of the operation of the valve. At the other end of fluid line 91 may be a pressure sensing device such as a bellows (sensing absolute pressure), a differential bellows (sensing a pressure differential) or a manually operable pressure generating device such as a controllable pump.

It will be apparent that such a control pilot tube could be applied to the valve of Fig. 7, communicating with the forward chamber 59c for variably opposing and adjusting the spring load offered by spring 85, whereby to effect remote control of a check valve such as that shown in Fig. 7.

I claim:

1. In a valve assembly for mounting within a fluid passage, a valve body comprising a hollow shell of faired longitudinal section; an annular valve seat; a mounting bracket attached to said valve seat and extending through the wall of said shell into the interior thereof; and means connecting said bracket, interiorly of said shell, to said valve body for sliding movement of the latter along its longitudinal axis.

2. In a valve assembly for mounting within a fluid passage defined by adjoining tube sections having end flanges, a valve body comprising a hollow shell of faired longitudinal section having a longitudinal slot therein; an annular body having means cooperable with said flanges to establish a sealed joint between the tube sections; an annular valve seat carried by said annular body within said fluid passage; a mounting bracket attached to said annular body within said fluid passage and extending through said slot into the interior of said shell; and means connecting said bracket, interiorly of said shell, to said valve body for sliding movement of the latter along its longitudinal axis.

3. In a valve assembly for mounting within a fluid passage, a valve body comprising a hollow shell of faired longitudinal section having a longitudinal slot therein; an annular valve seat; a mounting bracket attached to said valve seat and extending through said slot into the interior of said shell; and dashpot means connecting said bracket, interiorly of said shell, to said valve body for sliding movement of the latter along its longitudinal axis, said dashpot means resisting rapid movements of said valve body and causing it to move smoothly to a position required by pressure or flow changes, without chattering or hunting.

4. A valve assembly as defined in claim 3, wherein said mounting bracket is of thin, flat section and is arranged with its width extending in the direction of flow.

5. A valve as defined in claim 3, wherein said dashpot means consists in a cylinder having end members provided with central openings, a piston slidable in said cylinder, and a mounting rod attached to said piston, extending in both directions therefrom, passing through said openings and attached to the respective ends of said valve body shell.

6. A valve assembly as defined in claim 3, constituting a pressure relief valve; wherein said dashpot means comprises a cylinder having end members provided with central openings, a piston slidable in said cylinder, a mounting rod attached to said piston, extending in both directions therefrom, passing through said openings and attached to the respective ends of said valve body shell, and a spring interposed under compression between said piston and one of said cylinder ends and imposing on said valve body a closing load at a pre-selected release pressure value.

7. A valve assembly as defined in claim 3, wherein said valve body comprises a forward section having a radial flange at its maximum diameter, said radial flange providing a forwardly facing shoulder for engagement with said valve seat, a rear section abutted against said radial flange, and a mounting rod the ends of which are attached to the ends of the respective sections, said rod functioning to hold said sections together in abutting, coaxially assembled relation.

8. A valve assembly as defined in claim 3, wherein said valve body comprises a forward section having a radial flange at its maximum diameter, said radial flange providing a forwardly facing shoulder for engagement with said valve seat, a rear section abutted against said radial flange, and a mounting rod the ends of which are attached to the ends of the respective sections, said rod functioning to hold said sections together in abutting, coaxially assembled relation, and said dashpot means comprising a cylinder within said hollow body interior, having ends provided with openings through which said rod extends with limited radial clearance to define restricted bleed apertures, and a piston attached to said rod within said cylinder.

9. A valve assembly as defined in claim 3, wherein said valve body is of tear-drop longitudinal section, including a generally spherical forward portion which engages said valve seat in a circular area of said valve body disposed forwardly of the maximum diameter thereof.

10. A valve assembly as defined in claim 3, wherein said dashpot means comprises a cylinder, a piston therein consisting in a pair of dished, thin flexible discs having peripheral edges yieldingly engaging the inner wall of said cylinder, and a mounting rod extending through and secured to said piston, said cylinder having ends provided with openings through which said piston extends, the ends of said rod being secured to the ends of said valve body.

11. In a valve assembly for mounting within a fluid passage defined by adjoining tube sections having end flanges; an annular body having means cooperable with said flanges to establish a sealed joint between the tube sections; a valve seat carried by said annular body within said fluid passage; a valve body comprising a hollow shell of faired longitudinal section having a forward end portion cooperable with said seat and having a tapered rear portion provided with a plurality of narrow slots extending longitudinally of the valve body; a plurality of thin flat mounting brackets attached to said annular body and extending rearwardly and inwardly through said slots, said bracket being disposed in planes paralleling the direction of air flow through the valve; and means connecting said brackets, interiorly of said shell, to said valve body for sliding movement of the latter along its longitudinal axis.

12. A valve assembly as defined in claim 2 wherein said connecting means comprises a dashpot offering high resistance to rapid movement of said valve body and substantially no resistance to slow movement of said valve body, whereby said valve will assume full open position in response to any pressure of low magnitude of fluid moving in the valve opening direction.

13. A valve assembly as defined in claim 3, including a pilot tube connected to said dashpot means for communicating a control pressure thereto for actuating the same to move the valve in closing direction in opposition to the action of the fluid flow tending to move the valve in open direction.

References Cited in the file of this patent

UNITED STATES PATENTS

| Number | Name | Date |
|---|---|---|
| 1,676,125 | Wollin | July 3, 1928 |
| 2,522,145 | Thompson | Sept. 12, 1950 |
| 2,602,631 | Eickmeyer | July 8, 1952 |